United States Patent [19]

Hatfield, Jr.

[11] Patent Number: 5,025,149

[45] Date of Patent: Jun. 18, 1991

[54] INTEGRATED MULTI-SPECTRAL BORESIGHT TARGET GENERATOR

[75] Inventor: Dean C. Hatfield, Jr., Los Angeles, Calif.

[73] Assignee: Hughes Aircraft Company, Los Angeles, Calif.

[21] Appl. No.: 539,116

[22] Filed: Jun. 18, 1990

[51] Int. Cl.⁵ ............................................. G01B 11/26
[52] U.S. Cl. ..................................... 250/342; 356/152
[58] Field of Search ................ 356/152, 153; 250/342, 250/467.1, 334, 332

[56] References Cited

U.S. PATENT DOCUMENTS

| | | | |
|---|---|---|---|
| 4,155,096 | 5/1979 | Thomas et al. | 358/125 |
| 4,811,061 | 3/1989 | Sud et al. | 356/152 |
| 4,867,560 | 9/1989 | Kunitsugu | 356/152 |
| 4,917,490 | 4/1990 | Schaffer, Jr. et al. | 356/152 |

Primary Examiner—Constantine Hannaher
Attorney, Agent, or Firm—M. E. Lachman; W. J. Streeter; W. K. Denson-Low

[57] ABSTRACT

An integrated multi-spectral target generator for use with electro-optical systems that comprise visible and infrared sensors and a laser designator. A pinhole is illuminated with a multiband source to produce a single visible and infrared target which is detected by visible and infrared sensors. A pair of beamsplitters and an associated corner reflector precisely define the parallelism of the visible and infrared radiation transmitted from the multiband source along an optical axis. A reflective telescope is used to project the visible radiation to the visible sensor and the infrared radiation, in conjunction with a periscope, to the infrared sensor. The target generator does not require precision stabilization and uses a single inherently parallel path to generate visible and infrared boresight targets. The target generator enables a boresight procedure to be completed in about ten seconds without firing the laser designator.

20 Claims, 2 Drawing Sheets

INTEGRATED MULTI-SPECTRAL BORESIGHT TARGET GENERATOR

This invention was made with United States Government support under Contract No. DAAJ02-86-C-0017 awared by the Department of the Army. The United States government has certain rights to this invention.

BACKGROUND OF THE INVENTION

1. Field of the Invention

The present invention relates generally to electro-optical fire control systems, and more particularly, to a multi-spectral boresight target generator for use in such systems.

2. Description of Background Art

Modern military vehicles, such as helicopters, tanks, or fighter/interceptor planes, for example, employ electro-optical fire control systems, using multiple sensors to detect and track desired targets and delivery weapons thereto. The multiple sensors may include a visible (television) sensor, a forward looking infrared sensor, and laser rangefinder or target designator, all disposed on a single gimbal. In order to meet weapon delivery and laser designation performance goals, the boresight accuracy among the various sensors is required to be less than one pixel.

Conventional alignment systems for use with multiple sensors integrated on a single gimbal typically use multiple sources or mount the sources off-gimbal. These systems have a number of disadvantages which are manifested as poor boresight performance caused by several factors. The first is poor image quality resulting from residual stabilization noise. Another disadvantage is boresight error buildup resulting from multiple targets and optical paths used to generate the visible, laser, and infrared target beams. Very long boresight time lines, on the order of minutes, caused by slow heating of the infrared target and the processing time required to fire the laser, is an additional disadvantage of the prior art. In addition, these alignment systems are in general costly to build and align due to the reliance on precision assembly to produce an initial alignment setting, which is assumed to be maintained throughout the life of the system.

Accordingly, it is an objective of the present invention to provide an improved boresight target generator for use in an electro-optical fire control system. A further objective of the present invention is to reduce stabilization noise in boresight target generators. Still another objective of the invention is to provide a boresight target generator having reduced boresight error buildup. A further objective of the present invention is to reduce the number of optical paths utilized in boresight target generators. Yet another objective of the invention is the provision of a boresight target generator design having decreased boresight time lines. A still further objective of the present invention is the provision of cost efficient boresight target generator alignment system.

SUMMARY OF THE INVENTION

In accordance with the objectives and advantages of the present invention, a multi-spectral boresight target generator is provided that incorporates a pinhole illuminated with a multiband source to produce a target that is detectable by visible and infrared frequency band radiation sensors. One of the key features of the present invention is the use of a combined visible and infrared beamsplitter and a corner reflector to precisely define the parallelism of the visible and infrared beams. A reflective telescope is used in reverse to project infrared radiation by way of a periscope to an infrared sensor.

One feature of the present invention is that it does not require precise stabilization and it employs inherently parallel optical paths to provide visible and infrared boresight targets. The present invention enables a boresight procedure to be completed in about ten seconds. The design of the present invention is generally applicable whenever laser and visible and infrared sensors are integrated on a single gimbal. This design provides for relatively high performance at a relatively low cost.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENTS

Figure 1:
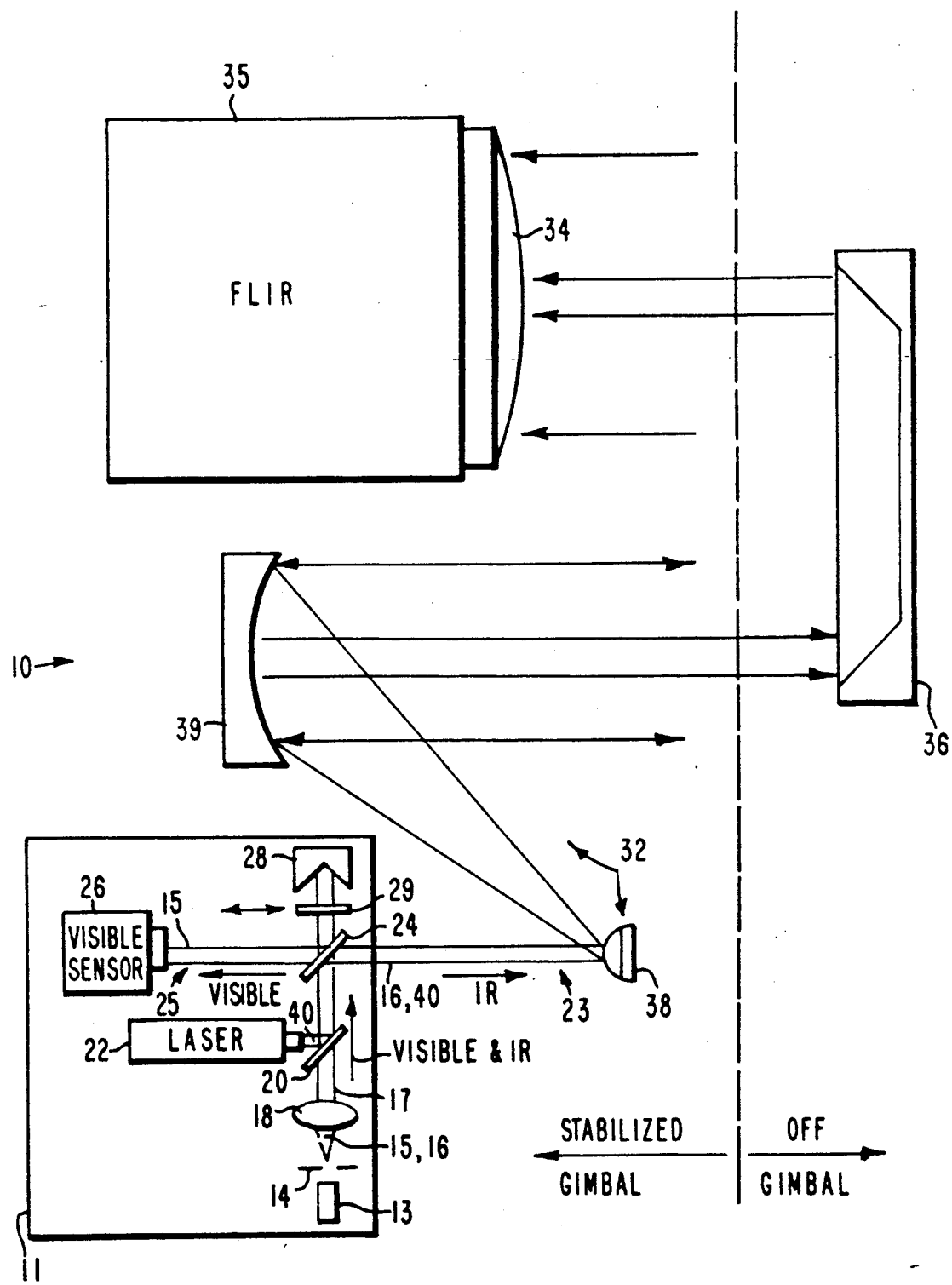
FIG. 1 is a shcematic drawing of an integrated multi-spectral target generator in accordance with the principles of the present invention.

Referring now to FIG. 1, there is shown an integrated target generator 10 in accordance with the present invention for use in an electro-optical fire control system. A visible/laser assembly 11 comprises the heart of the integrated target generator 10. The visible/laser assembly 11 comprises an integrated or dual band source 13, a pinhole aperture 14, and a collimating element 18 disposed along a first optical path 17. A first beamsplitter 20 and a second beamsplitter 24 are sequentially disposed along the first optical path 17. A corner reflector 28 is disposed at the distal end of the first optical path 17 opposite the dual band source 13. Interposed between the second beamsplitter 24 and the corner reflector 28 is an optical shutter 29. The dual band source 13, to be discussed in detail hereinafter, is adapted to simultaneously emit visible and infrared radiation 15, 16 along the first optical path 17, which is collimated by the collimating element 18.

Figure 2:
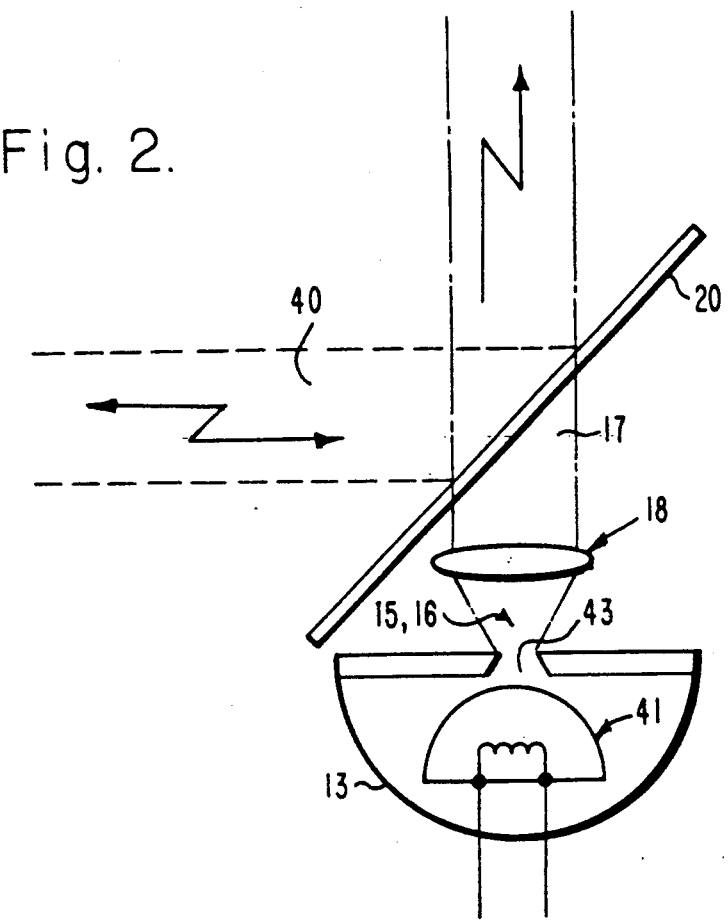
FIG. 2 is a schematic drawing of a first portion of an optical path of the target generator of FIG. 1 showing the components thereof and thier organizational relationships.

The collimating element 18 may comprise refractive or reflective collimating optics, such as a lens or mirrors. A lens, for example, may be comprised of zinc selenide, for example, and may have a diameter of about 0.3 inch (0.8 cm). The collimating lens 18 is adapted to collimate the visible and infrared radiation 15, 16 which is transmitted through the pinhole aperture 14. The first beamsplitter 20 is disposed at an angle of about 45 degrees relative to the first optical path 17, and is adapted to transmit both visible and infrared radiation 15, 16. The first beamsplitter 20 may be comprised of zinc selenide, for example, and is adapted to transmit the visible and infrared radiation 15, 16 provided by the source 13, and is adapted to reflect the laser radiation 40 provided by a laser 22 (as best shown in FIG. 2). The laser 22, which may comprise a laser rangefinder, for example, is adapted to boresight external targets, for example. The laser 22 is adapted to emit laser radiation 40 toward the first beamsplitter 20, which is adapted to reflect the laser radiation 40 out of the electro-optical system toward a target, for example. The optical shutter 29 is adapted to be in a closed position during the time and the laser 22 is operational, to prevent laser radiation from impinging on a visible sensor 26.

The second beamsplitter 24 is disposed at an angle of about 45 degrees relative to the first optical path 17, and may be comprised of silicon dioxide (quartz), for example. The front surface of the second beamsplitter 24 is adapted to reflect the infrared radiation 16 and laser radiation 40 along a second optical path 23 orthogonal to the first optical path 17, and is adapted to transmit the visible radiation 15 further along the first optical path 17 and, in conjunction with the corner reflector 28, the rear surface of the second beamsplitter 24 is adapted to reflect the visible radiation 15 along a third optical path 25 opposite to the second optical path 23, and toward the visible sensor 26.

As previously mentioned, the corner reflector 28 is diposed at the distal end of the first optical path 17 on the far side of the second beamsplitter 24 and the optical shutter 29. The corner reflector 28 is adapted to retroreflect visible radiation 15 which is transmitted past the optical shutter 29, which is open during boresight operation. The shutter 29 is comprised of aluminum for example. As previously mentioned, the corner reflector 28 is adapted to reflect the collimated visible radiaition 15 back toward the second beamsplitter 24, which partially reflects it toward the visible sensor 26. This provides for attenuation of the energy level of the visible radiation 15 that is necessary to avoid saturation of the visible sensor 26.

In operation, when the integrated target generator 10 is energized, the infrared radiation 16 is reflected by the second beamsplitter 24 along optical path 23, and is projected through a telescope assembly 32 to an aperture 34 of an infrared sensor 35, such as a forward looking infrared assembly, by way of a periscope 36. A secondary mirror 38 of the telescope assembly 32 relfects the infrared radiation 16 toward a primary reflector 39, which then reflects the infrared radiation 16 toward the periscope 36. The periscope 36 couples the infrared radiation 16 into the aperture 34 of infrared sensor 35. The primary reflector 39 may comprise a 16X radiation expander to collimate the infrared radiation 16. The periscope 36 may comprise a 1.375 inch (3.49 cm) periscope that has a limiting aperture that produces a blur circle of 0.7 milliradians at 10 microns, for example.

Referring now to FIG. 2, there are shown components of the dual band source 13 disposed along a first portion of the optical path 17. A light source 41, which may be a quartz halogen or a quartz halogen tungsten bulb, for example, that operates at about 200 degrees Celsius, is adapted to emit visible and infrared radiation 15, 16. The temperature required to form a target (not shown) is a function of the sensitivity of the visible sensor 26, the sensitivity of the infrared sensor 35, and the aperture 34 of the infrared sensor 35 (all shown in FIG. 1) and the signal to noise ratio required by the target tracking system of the electro-optical system. Using a predefined system parameters, a minimum target signature may be derived, which for the present invention is about 150 degerss Celsius. Signals greater than or equal to 150 degrees Celsius produce an adequate boresight target and the present invention satisfies this requirement by using the quartz halogen light source 41 in the exemplary embodiment. The fast heating characteristics of the light source 41 means that it need be only for about ten seconds in order to complete the boresight alignment of both the visible sensor 26 and the infrared sensor 35.

The integrated dual band light source 41, 13 has a pinhole opening 43 whose size is primarily determined by the target size needed in the widest field of view of the infrared sensor 35 (shown in FIG. 1). Another consideration is the periscope 36 (shown in FIG. 1) which may have a 1.375 inch (3.49 cm) diameter entrance aperture, for example, which acts as a limiting aperture that produces a blur circle at 10 microns of 0.7 milliradians. Using this as a guideline, the size of the pinhole opening 43 may be calculated as:

$$\text{Pinhole size} = (0.7 \times 10^{-3}) \times (\text{laser effective focal length})$$
$$= (0.7 \times 10^{-3}) \times (20 \text{ in}) = 0.014 \text{ in} = 0.036 \text{ cm}$$

When boresighting the visible sensor 26 and the infrared sensor 35, the visible and infrared radiation 15, 16 are simultaneously emitted through the pinhole opening 43, and transmitted along the first optical path 17 through the collimating lens 18 and the first beamsplitter 20. The collimating lens 18 is designed to have an 0.3 inch (0.762 cm) exit pupil, for example, in the present embodiment. In a tracking mode, laser radiation 40 is transmitted by the laser 22 through the telescope 32 to an external target. The laser radiation 40 is provided by the laser 22 enables target designation and target rangefinding.

Figure 3:
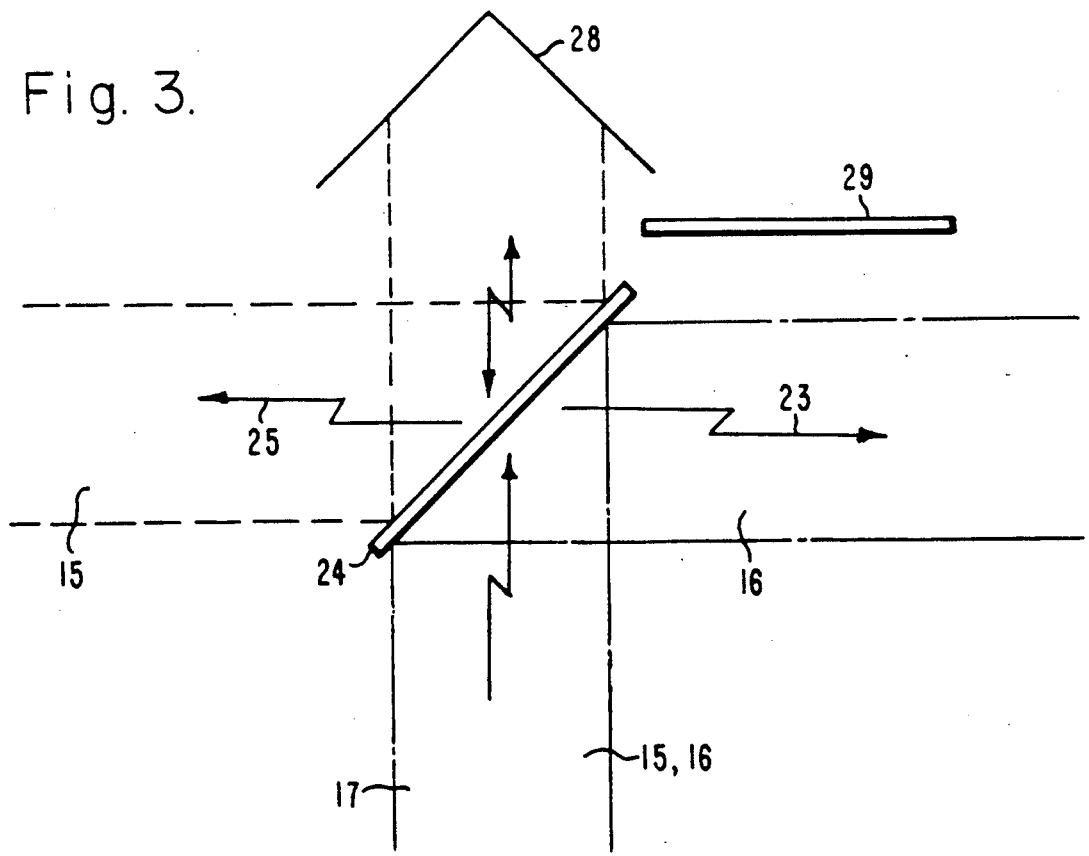
FIG. 3 is a schematic drawing of a second portion of the optical path of the target generator of FIG. 1 showing the components thereof and their organizational relationships.

Referring now to FIG. 3, there is shown a diagram illustrating the components disposed along a second portion of the first optical path 17. When the visible sensor 26 and the infrared sensor 35 (shown in FIG. 1) are boresighted, the visible and infrared radiation 15, 16 are simultaneously transmitted along the first optical path 17. The infrared radiation 16 is reflected by the second beamsplitter 24 toward the infrared sensor 35 along the second optical path 23. Visible radiation 15 is transmitted through the second beamsplitter 24 onto the corner reflector 28. The visible radiation 15 is reflected back toward the second beamsplitter 24 by the corner reflector 28. The optical shutter 29 is open when the visible sensor 26 and the infrared sensor 35 are boresighted, and is closed when the laser 22 is in operation.

The visible radiation 15 that is reflected back toward the second beamsplitter 24 by the corner reflector 28, is partially reflected by the second beamsplitter 24 into the visible sensor 26 along the third optical path 25. This process provides for attenuation of the visible radiation 15 that is necessary to avoid saturation of the visible sensor 26. The visible radiation 15 which is transmitted along optical path 25 to the visible sensor 26 is aligned substantially parallel to the infrared radiation 16 which is transmitted along path 23 to the second lens 38 and subseqnently to the infrared sensor 35. This parallel alignment is due to the arrangement of the corner reflector 28 and the second beamsplitter 24, and the only error in parallelism is introduced by the non-parallelism of the two opposed sides of the second beamsplitter 24.

Thus there has been described a new and improved integrated multi-spectral target generator for use with an electro-optical fire control system. The integrated multi-spectral target generator of the present invention eliminates stabilization error since the integrated source is disposed on the same gimbal as the laser and the visible sensor. The design of the present invention eliminates precision assembly tasks with the exception of that normally associated with the laser itself. This design is robust enough to allow complete removal and replacement of any or all sensors without subsequent mechanical alignment upon replacement. A simple ten-second boresight alignment procedure, which may be done at any time or location, is all that is required to restore the system to sub-pixel boresight performance.

The present invention provides for inherently precise target generation that is accomplished with a single alignment step. This alignment step involves the precise alignment of the laser 22, the beamsplitter 20, and the boresight target generator 13 relative to one another. No other optical or mechanical component has a substantial influence on the optical boresight except the periscope 36, which is typically an extremely precise device. Normal periscope manufacturing techniques typically yield a maximum of five microradians error in optical alignment. Overall boresight alignment of the present invention is on the order of twenty microradians relative to the infrared sensor.

It is to be understood that the above-described embodiment is merely illustrative of one of the many specific embodiments that represent applications of the principles of the present invention. Clearly, numerous and other arrangments can be readily devised by those skilled in the art without departing from the scope of the present invention.

What is claimed is:

1. A multi-spectral boresight target generator comprising:
   dual band boresight target generator means for simultaneously emitting visible and infrared frequency radiation along a first optical path;
   a corner reflector disposed at the distal end of the first optical path that is adapted to retroreflect visible radiation;
   a first beamsplitter disposed along the first optical path that is adapted to transmit visible and infrared radiation provided by the dual band boresight target generator means along the first optical path;
   a second beamsplitter disposed along the first optical path between the first beamsplitter and the corner reflector that is adapted to reflect infrared radiation from a front surface thereof along a second optical path, transmit visible radiation toward the corner reflector, and reflect the visible radiation retroreflected by the corner reflector from a rear surface thereof along a third optical path;
   an infrared sensor disposed along the second optical path that is adapted to image the infrared radiation reflected by the second beamsplitter; and
   a visible sensor disposed along the third optical path that is adapted to image the visible radiation.

2. The target generator of claim 1 further comprising a collimating element disposed between the dual band boresight target generator and the first beamsplitter that is adapted to collimate the visible and infrared radiation provided thereby and transmit the collimated radiation along the first optical path.

3. The target generator of claim 1 wherein the first beamsplitter is adapted to reflect radiation from an infrared laser source and couple the laser radiation along the first optical path.

4. The target generator of claim 1 wherein the dual band boresight target generator comprises a quartz halogen light source.

5. The target generator of claim 4 wherein the light source operates at temperature of approximately 200 degrees Celsius.

6. The target generator of claim 1 wherein the first beamsplitter comprises a zinc selenide beamsplitter.

7. The target generator of claim 1 wherein the second beamsplitter comprises a silicon dioxide beamsplitter.

8. An improved boresight target for use in an electro-optical fire control system having a visible sensor and an infrared sensor respectively disposed along visible and infrared optical paths, the improvement comprising:
   an integrated boresight target source adapted to simultaneously emit radiation in the visible and infrared frequency bands along an optical path, the emitted radiation defining a target that is detectable by the visible and infrared sensors;
   a corner reflector disposed along the optical path at the distal end thereof that is adapted to retroreflect the visible radiation applied thereto; and
   a beamsplitter having front and rear surfaces disposed along the optical path between the integrated boresight target source and the corner reflector, that is adapted to reflect infrared radiation from the front surface thereof along the infrared optical path toward the infrared sensor, transmit the visible radiation along the optical path toward the corner reflector, and reflect the visible radiation from the rear surface thereof retroreflected by the corner reflector along the visible optical path toward the visible sensor;
   wherein the beamsplitter and the corner reflector precisely define the parallelism of the visible and infrared optical paths tranversed by the visible and infrared radiation.

9. The boresight target of claim 8 wherein the electro-optical fire control system further comprises a laser that is adapted to boresight targets, and wherein the beamsplitter is adapted to reflect laser light provided by the laser along the infrared optical path.

10. The boresight target of claim 8 wherein the target source comprsies a quartz halogen light source.

11. The boresight target of claim 8 wherein the beamsplitter comprises a silicon dioxide beamsplitter.

12. An integrated multi-spectral boresight target generator for an electro-optical fire control system, said target genertor comprising:
   an integrated source having a pinhole opening that is adapted to emit visible and infrared radiation;
   a laser source adapted to emit laser radiation;
   a collimating element disposed adjacent to the integrated source, for collimating the visible and infrared radiation to provide collimated visible and infrared radiation and transmitting the collimated radiation along a common optical path;
   a first beamsplitter disposed along the common optical path that is adapted to transmit the visible and infrared radiation provided by the integrated source along the common optical path, and reflect laser radiation provided by the laser source;

a corner reflector disposed at the distal end of the common optical path that is adapted to retroreflect the visible radiation back along the common optical path;

a second beamsplitter disposed along the common optical path that is adapted to reflect the infrared radiation provided by the integrated source from its front surface along an infrared optical path toward an infrared sensor, and transmit the visible radiation provided by the integrated source toward the corner reflector, and reflect retroreflected visible radiation from its rear surface along a visible optical path toward a visible sensor; and a reflective telescope assembly disposed along the infrared optical path and adapted to expand the collimated infrared radiation to the infrared sensor, and to transmit the laser radiation out of the system;

whereby parallel optical paths are provided to generate a target detectable by the visible and infrared sensors that provides a boresight target which enables boresight alignment without using the laser source.

13. The target generator of claim 12 wherein the integrated source comprises a quartz halogen light source.

14. The target generator of claim 13 wherein the light source operates a temperature of approximately 200 degrees Celsius.

15. The target generator of claim 12 wherein the collimating lens comprises a zinc selenide lens.

16. The target generator of claim 12 wherein the first beamsplitter comprises a zinc selenide beamsplitter.

17. The target generator of claim 12 wherein the second beamsplitter comprises a silicon dioxide beamsplitter.

18. The target generator of claim 12 further comprising an optical shutter disposed between the corner reflector and the second beamsplitter.

19. The target generator of claim 12 wherein the laser source comprises a laser rangefinder.

20. The target generator of claim 12 wherein the laser source comprises an infrared laser source.

* * * * *